(12) United States Patent
Chen et al.

(10) Patent No.: US 9,511,546 B2
(45) Date of Patent: Dec. 6, 2016

(54) THREE DIMENSIONAL PRINTING APPARATUS

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Peng-Yang Chen, New Taipei (TW); Chung-Kang Chu, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 27 days.

(21) Appl. No.: 14/645,409

(22) Filed: Mar. 11, 2015

(65) Prior Publication Data
US 2016/0129631 A1    May 12, 2016

(30) Foreign Application Priority Data

Nov. 10, 2014    (TW) .............................. 103138901 A

(51) Int. Cl.
*B29C 59/16*    (2006.01)
*B29C 67/00*    (2006.01)
(Continued)

(52) U.S. Cl.
CPC ....... *B29C 67/0085* (2013.01); *B29C 67/0062* (2013.01); *B33Y 30/00* (2014.12); *B33Y 40/00* (2014.12)

(58) Field of Classification Search
CPC ............ B29C 67/0062; B29C 67/0085; B29C 67/0088; B33Y 10/00; B33Y 30/00; B33Y 50/02; B29L 2009/00
(Continued)

(56) References Cited

U.S. PATENT DOCUMENTS

| 5,089,184 A | 2/1992 | Hirano et al. |
| 5,573,721 A | 11/1996 | Gillette |

(Continued)

FOREIGN PATENT DOCUMENTS

| TW | 200526386 | 8/2005 |
| WO | 2013026087 | 2/2013 |

OTHER PUBLICATIONS

Office Action of Taiwan Counterpart Application, issued on Sep. 6, 2016, p. 1-p. 7.

*Primary Examiner* — Joseph S. Del Sole
*Assistant Examiner* — Thukhanh T Nguyen
(74) *Attorney, Agent, or Firm* — Jianq Chyun IP Office

(57) ABSTRACT

A three dimensional printing apparatus is provided. The three-dimensional printing apparatus includes a tank, a rotatable platform, a light source module and a controller. The rotatable platform is elevatably disposed above the tank, and the light module is disposed under the tank. When the controller controls the rotatable platform elevating to a height along an axis direction, the controller controls the rotatable platform rotating a plurality of rotating angles in sequence around the axis direction and controls the light source module irradiating liquid-formation material, so as to sequentially solidify a plurality of object sections of a single layer object.

15 Claims, 9 Drawing Sheets

(51) Int. Cl.
*B33Y 30/00* (2015.01)
*B33Y 40/00* (2015.01)

(58) Field of Classification Search
USPC .......................................................... 425/375
See application file for complete search history.

(56) References Cited

U.S. PATENT DOCUMENTS

| | | | | |
|---|---|---|---|---|
| 8,172,562 | B2* | 5/2012 | Mattes | B29C 67/0077 |
| | | | | 264/112 |
| 8,778,252 | B2* | 7/2014 | Mackie | B29C 67/0055 |
| | | | | 264/308 |
| 2014/0265034 | A1 | 9/2014 | Dudley | |

* cited by examiner

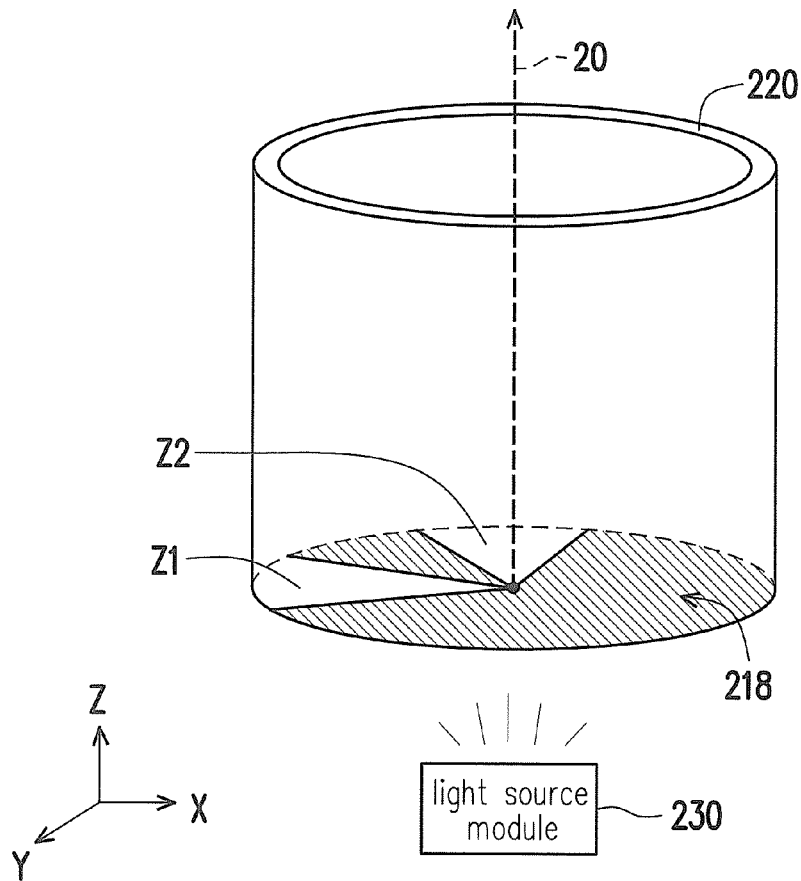

FIG. 6

| Obtain sub-cross-sectional profiles of a plurality of object sections of a layer object according to a three-dimensional model information of at least one layer object | S701 |

| Control a rotatable platform to sequentially rotate a plurality of rotating angles around an axis direction when the rotatable platform moves to a height along the axis direction, and control a light source module to irradiate a liquid-formation material according to the sub-cross-sectional profile of each of the object sections, so as to sequentially solidify the object sections of the layer object | S702 |

FIG. 7

THREE DIMENSIONAL PRINTING APPARATUS

CROSS-REFERENCE TO RELATED APPLICATION

This application claims the priority benefit of Taiwan application serial no. 103138901, filed on Nov. 10, 2014. The entirety of the above-mentioned patent application is hereby incorporated by reference herein and made a part of this specification.

BACKGROUND

1. Technical Field

The technical field relates to a printing apparatus, and particularly relates to a three-dimensional printing apparatus.

2. Description of Related Art

As technology advanced in the recent years, many methods that utilize additive manufacturing technology (e.g. layer-by-layer model construction) to build three-dimensional (3D) physical models have been proposed. Generally speaking, the additive manufacturing technology is to transfer data of the design of a 3D model, which is constructed by software, such as computer aided design (CAD), to multiple thin (quasi-two-dimensional) cross-sectional layers that are stacked in sequence. In the meantime, many techniques for forming thin cross-sectional layers are also proposed. For example, a printing module of a printing apparatus is usually configured to move above a base along an XY plane according to spatial coordinates XYZ constructed according to the design data of the 3D model, so as to use a construction material to form shapes of the cross-sectional layers correctly.

Take the technique of forming a three-dimensional object by solidifying the construction material with a light source for example, the printing module is adapted to be immersed in a liquid-formation material contained in a tank, and a light source module is used to irradiate the liquid-formation material, used as the construction material, on the XY plane, so as to solidify the liquid-formation material and stack it on a movable platform. Accordingly, by moving the movable platform layer by layer along the Z-axis direction, the liquid-formation material can be gradually solidified and stacked to form the three-dimensional object. It should be noted that when the light source is disposed under a tank, the object being printed that is just solidified and formed with the light source is adhered to the bottom of the tank. To continue solidifying the liquid-formation material and stacking layer by layer, the three-dimensional printing apparatus needs to shake or swing the tank to separate the three-dimensional object being printed and the bottom of the tank. However, if the speed of shaking of the tank is too fast, the three-dimensional object may be broken during the process of being separated from the bottom of the tank. However, if the speed of shaking the tank is too slow, the speed of three-dimensional printing also becomes slow. Thus, how to improve the speed and quality of three-dimensional printing is still a major issue for the researchers in this field.

SUMMARY

Accordingly, the disclosure provides a three-dimensional printing apparatus capable of sequentially solidifying a plurality of object sections of a layer object through rotation of a rotatable platform, and separating a solidified object section and a bottom of a tank through rotation of the rotatable platform.

The disclosure provides a three-dimensional printing apparatus adapted to print a three-dimensional object including at least one layer object. The three-dimensional printing apparatus includes a tank, a rotatable platform, a light source module, and a controller. The tank contains a liquid-formation material, and the rotatable platform is elevatably disposed above the tank. The light source module is disposed under the tank, and the controller is coupled to the light source module and the rotatable platform. When the controller controls the rotatable platform to move to a height along an axis direction, the controller controls the rotatable platform to sequentially rotate a plurality of rotating angles around the axis direction and controls the light source module to irradiate the liquid-formation material, so as to sequentially solidify a plurality of object sections of the at least one layer object. Each of the rotating angle at least corresponds to one of the object sections.

The disclosure provides a three-dimensional printing apparatus adapted to print a three-dimensional object including at least one layer object. The three-dimensional printing apparatus includes a tank, a rotatable platform, a light source module, and a controller. The tank contains a liquid-formation material, and the rotatable platform is elevatably disposed above the tank. The light source module is disposed under the tank, and the controller is coupled to the light source module and the rotatable platform. When the controller controls the rotatable platform to move to a height along an axis direction, the controller controls the light source module to irradiate the liquid-formation material according to an irradiated area. Before the rotatable platform elevates from the height to another height along the axis direction, the controller controls the rotatable platform to rotate around the axis direction. During rotation of the rotatable platform, the irradiated area provided by the light source module rotates around the axis direction, so as to completely solidify the layer object.

Based on the above, in the embodiments of the disclosure, by controlling the rotation of the rotatable platform and a irradiating shape of the light source module, the object sections of the layer object are sequentially solidified one by one between the rotatable platform and the bottom of the tank. Therefore, each time when the rotatable platform is at a height and sequentially rotates one of the rotating angles during the process of printing one layer object, the light source module sequentially irradiates the liquid-formation material according to a profile information of each object section. Besides, when the printing process of each object section is completed, the three-dimensional printing apparatus of the disclosure may separate the object section that is just solidified and the bottom of the tank by rotating the rotatable platform. In this way, the three-dimensional printing apparatus of the disclosure saves a step of shaking the tank to separate the layer object and the tank, and the speed and quality of three-dimensional printing are thus improved.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 6 is an exemplary schematic view illustrating changing an irradiated area according to an embodiment of the disclosure.

FIG. 7 is a flowchart illustrating a printing method of a three-dimensional printing apparatus according to an embodiment of the disclosure.

DESCRIPTION OF THE EMBODIMENTS

Figure 1:
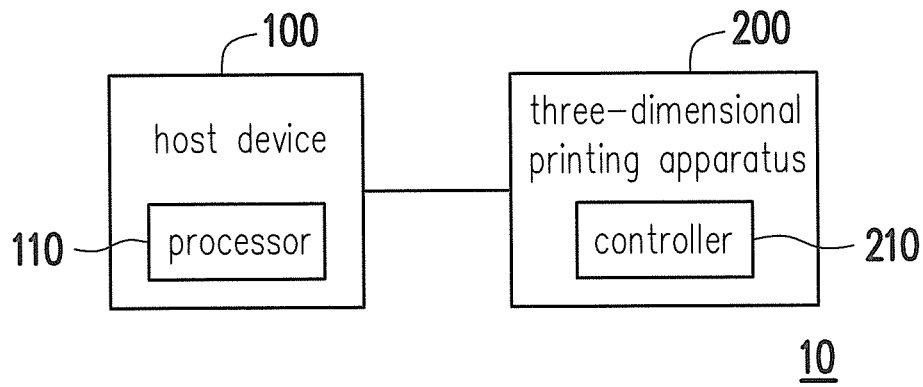
FIG. 1 is a block diagram illustrating a three-dimensional printing system according to an embodiment of the disclosure.

It is to be understood that both the foregoing and other detailed descriptions, features, and advantages are intended to be described more comprehensively by providing embodiments accompanied with figures hereinafter. In the following embodiments, wording used to indicate directions, such as "up," "down," "front," "back," "left," and "right," merely refers to directions in the accompanying drawings. Therefore, the directional wording is used to illustrate rather than limit the disclosure. Moreover, the same or similar reference numerals represent the same or similar elements in the following embodiments.

FIG. 1 is a block diagram illustrating a three-dimensional printing system according to an embodiment of the disclosure. Referring to FIG. 1, a three-dimensional printing system 10 includes a host device 100 and a three-dimensional printing apparatus 200. The host device 100 is coupled to the three-dimensional printing apparatus 200 and includes a processor 110 having computing and processing functions. The three-dimensional printing apparatus 200 includes a controller 210 configured to control a plurality of components of the three-dimensional printing apparatus 200, so as to carry out a three-dimensional printing function.

More specifically, the host device 100 is a device with computing function, which may be a computer device, such as a laptop computer, a tablet computer, or a desktop computer, etc. The disclosure is not intended to limit the type of the host device 100. In this embodiment, the processor 110 of the host device 100 is capable of editing and processing a three-dimensional model of a three-dimensional object and transmitting corresponding three-dimensional printing information to the three-dimensional printing apparatus 200, such that the three-dimensional printing apparatus 200 is able to print out the three-dimensional object corresponding to the three-dimensional printing information. More specifically, the three-dimensional model may be a digital three-dimensional image file that is constructed by the host device 100 by means of computer-aided design (CAD) or animation modeling software, for example.

The three-dimensional printing apparatus 200 is adapted for printing a three-dimensional object according to the three-dimensional printing information transmitted by the host device 100. More specifically, the controller 210 controls the operation of each component of the three-dimensional printing apparatus 200 according to the three-dimensional printing information, so as to reiteratively print a formation material on a platform until the whole three-dimensional object is completed.

The processor 110 and the controller 210 may be a central processing unit (CPU), a programmable microprocessor for general or special use, a digital signal processor (DSP), a programmable controller, an application specific integrated circuit (ASIC), a programmable logic device (PLD), other similar devices, or a combination of these devices, for example. Nevertheless, the disclosure is not intended to limit the types of the processor 110 and the controller 210.

It should be noted that the three-dimensional model is further edited and computed to generate the three-dimensional printing information that the three-dimensional printing apparatus 200 reads to execute the printing function accordingly. More specifically, the processor 110 may perform a slicing process to the three-dimensional model to obtain cross-sectional profiles of a plurality of layer objects, such that the three-dimensional printing apparatus 200 are able to sequentially print the layer objects according to the cross-sectional profiles of the layer objects. In other words, the layer objects are stacked to form the three-dimensional object.

It should be noted in particular that in this exemplary embodiment, the layer objects forming the three-dimensional object are divided into a plurality of object sections. More specifically, the processor 110 may divide one layer object into a plurality of object sections according to the cross-sectional profile of the layer object and obtain a sub-cross-sectional profile of each of the object sections. In other words, in addition to obtaining the layer objects by performing the slicing process according to a three-dimensional model information, the processor 110 of this embodiment further performs an additional dividing/cutting process to obtain the sub-cross-sectional profiles of the object sections forming each of the layer objects.

Further to the above, the processor 110 generates corresponding control code files according to of the sub-cross-sectional profiles of the object sections for the controller 210 of the three-dimensional printing apparatus 200 to control the components of the three-dimensional printing apparatus 200 according to the control code files, so as to form the object sections of each of the layer objects on the platform. Moreover, in this exemplary embodiment, the control code files are associated with the object sections that form each layer object, such that the three-dimensional printing apparatus 200 prints each object section sequentially according to the control code files. Here, the control code files are the three-dimensional printing information that the controller 210 reads to execute the printing function accordingly. In an embodiment, the control code file is a G code file, for example.

Figure 2:
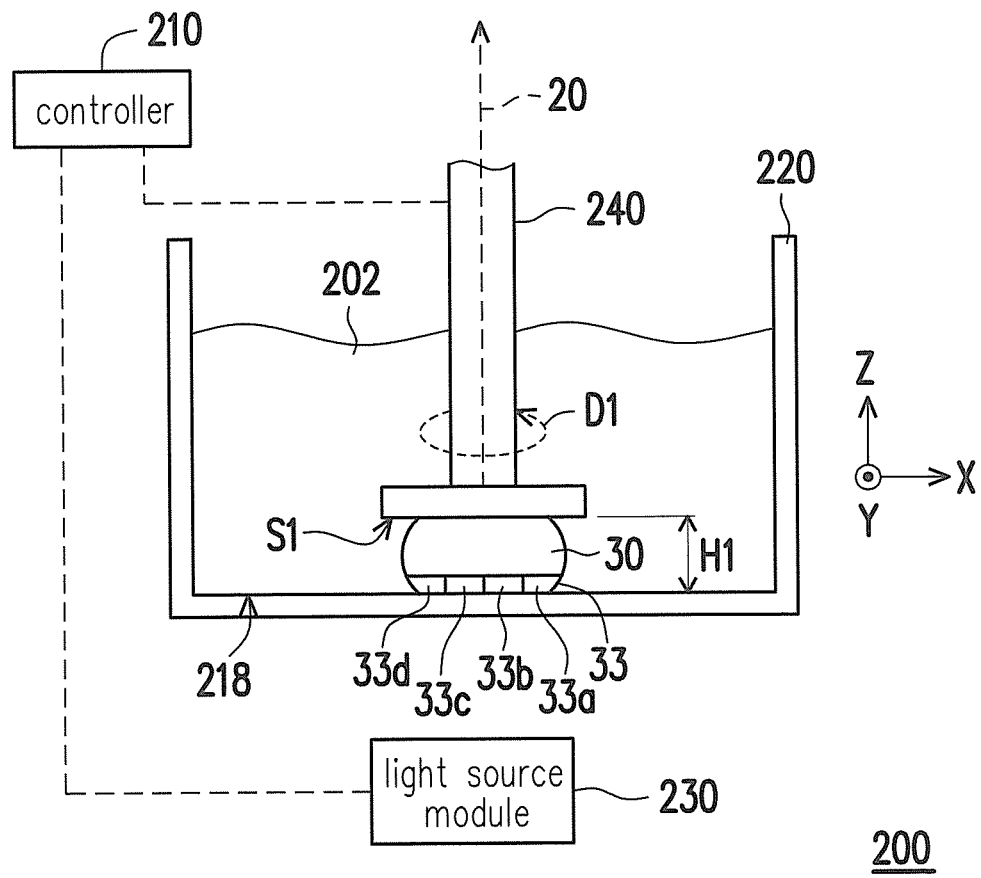
FIG. 2 is a schematic view illustrating a three-dimensional printing apparatus according to an embodiment of the disclosure.

FIG. 2 is a schematic view illustrating a three-dimensional printing apparatus according to an embodiment of the disclosure. With reference to FIG. 2, in this embodiment, a three-dimensional printing apparatus 200 is a SL (Stereo Lithography) three-dimensional printing apparatus and includes a controller 210, a tank 220, a light source module 230, and a rotatable platform 240. Here, a Cartesian coordinate system is used to describe the relevant components and their motions. The tank 220 is configured to contain a liquid-formation material 202, and the rotatable platform 240 is controlled by the controller 210 and is elevatably disposed above the tank 220 along an axis direction 20. In addition, the axis direction 20 is parallel to Z-axis. Accordingly, the rotatable platform 240 can be moved into or out of the tank 220 and is immersed in the liquid-formation material 202. The controller 210 is coupled to the light source module 230 and the rotatable platform 240. The controller 210 controls the rotatable platform 240 to ascend gradually along the axis direction 20 above the tank 220, such that at least one layer object of a three-dimensional object 30 is solidified on the rotatable platform 240 layer by layer.

To be more specific, the three-dimensional printing apparatus 200 irradiates a bottom 218 of the tank 220 with light of the light source module 230, so as to solidify the liquid-formation material 202 between a formation surface S1 of the rotatable platform 240 and the bottom 218 of the tank 220. Then, the three-dimensional printing apparatus 200 gradually drives the rotatable platform 240 away from the bottom 218 of the tank 220 along the Z axis, so as to solidify a plurality of layer objects of the three-dimensional object 30 layer by layer.

It should be noted that in this exemplary embodiment, the controller 210 controls the rotatable platform 240 to elevate to a height H1, so as to print a layer object 33. When the controller 210 controls the rotatable platform 240 to move to the height H1 along the axis direction 20, the controller 210 controls the rotatable platform 240 to rotate a plurality of rotating angles in sequence around the axis direction 20 and simultaneously controls the light source module 230 to irradiate the liquid-formation material 202, so as to sequentially solidify a plurality of object sections 33a to 33d of the layer object 33 once a time. It should be noted that the layer object 33 further includes other object sections that are not shown herein in addition to the object sections 33a and 33d currently shown.

More specifically, the controller 210 firstly controls a shape of irradiation of the light source module 230 according to a sub-cross-sectional profile of the object section 30a, so as to solidify the object section 30a. After the object section 30a is formed on the bottom 218 of the tank 220, the controller 210 controls the rotatable platform 240 to rotate a rotating angle along a direction D1, such that the object section 30a may be separated from the bottom 218 of the tank 220. Then, the controller 210 controls the shape of irradiation of the light source module 230 according to a sub-cross-sectional profile of the object section 30b, so as to solidify the object section 30b adjacent to the object section 30a. Similarly, through rotation of the rotatable platform 240, the object sections 33a to 33d of the layer object 33 are sequentially formed and separated from the bottom 218 of the tank 220 one by one.

Based on the above, the rotatable platform 240 of this exemplary embodiment is not only movable vertically along the axis direction 20 but also rotatable on an XY plane. Thus, in the process of printing one layer object, by moving the rotatable platform 240 on the XY plane, each object section of one layer object is sequentially formed between the formation surface S1 and the bottom 218. The formation surface S1 is parallel to the XY plane and is perpendicular to the axis direction 20. Furthermore, each time the rotatable platform 240 rotates a rotating angle on the XY plane, at least one object section is formed between the formation surface S1 and the bottom 218. Namely, each rotating angle that the rotatable platform 240 rotates at least corresponds to one of the object sections.

In this exemplary embodiment, the light source module 230 is disposed under the tank 220. The controller 210 controls the light source module 230 according to the sub-cross-sectional profile of each object section, such that a point light source or a planar light source provided by the light source module 230 irradiates a designated part on the bottom 218 of the tank 220. The light source module 230 is a laser element and/or a galvanometer module, a light projection module based on digital light processing (DLP) technology, or a LED light bar, for example. This disclosure is not intended to limit the type and composition of the light source module 230. The liquid-formation material 202 is a photosensitive resin, for example. The light source module 230 is configured to provide light of a wave band, such as ultraviolet light or laser light, for solidifying the photosensitive resin.

In the following, details about obtaining object sections of one layer object and printing the object sections of the layer object are described below. It should be noted that in the exemplary embodiment in the following, cutting angles refer to angles for cutting the layer object into the object sections, and values of the cutting angles are adapted as a computing parameter for computing the sub-cross-sectional profiles of the object sections. The rotating angle is an angle that the rotatable platform rotates around the axis direction 20, and is a controlling parameter to control a range of rotation of the rotatable platform.

In this exemplary embodiment, at least one layer object is divided into the object sections according the values of the cutting angles, and the cutting angles respectively correspond to the object sections. In other words, when the processor 110 obtains a cross-sectional profile of one layer object, the processor 110 may obtain a plurality of sub-cross-sectional profiles corresponding to a plurality of object sections according to the values of the cutting angles and a position of axis of the axis direction 20 on the XY plane. In brief, the sub-cross-sectional profiles of the object sections on the XY plane are determined based on the values of the corresponding cutting angles and a cross-sectional profile of the layer object on the XY plane. In this way, the controller 210 may control the light source module 230 to irradiate the liquid-formation material 202 according to the sub-cross-sectional profile of each of the object sections.

Figure 3A:
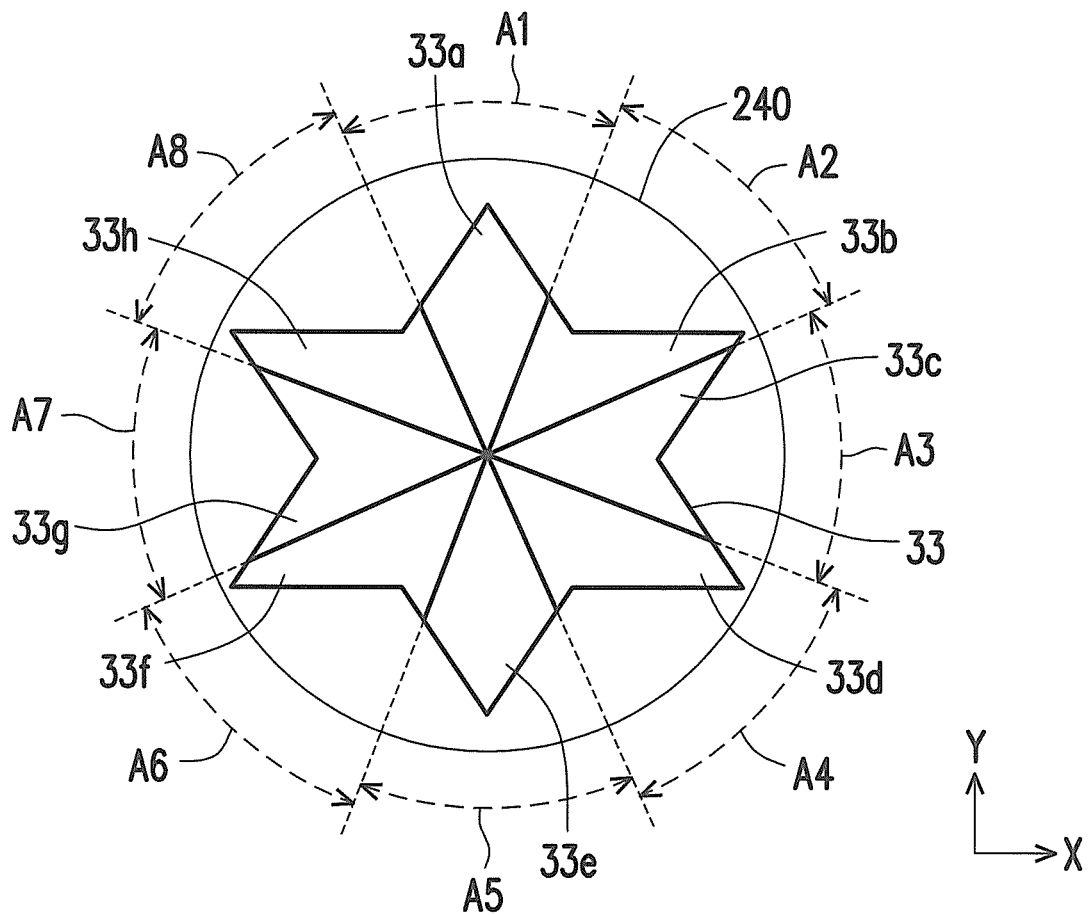
FIGS. 3A to 3B are exemplary schematic views illustrating dividing one layer object according to an embodiment of the disclosure.

It should be noted that the value of the cutting angle in this exemplary embodiment may be a constant value or a variable value. For example, FIG. 3A is an exemplary schematic view illustrating dividing one layer object according to an embodiment of the disclosure. In the example shown in FIG. 3A, it is assumed that there are 8 cutting angles, which are cutting angles A1, A2, A3, A4, A5, A6, A7, and A8, respectively. Values of the cutting angles A1 to A8 are the same, and a total of the values of the cutting angles A1 to A8 are 360 degrees. In other words, the value of each of the cutting angles A1 to A8 is 45 degrees.

Thus, the layer object 33 may be divided into 8 object sections, which are the object sections 33a, 33b, 33c, 33d, 33e, 33f, 33g, and 33h, according to the cutting angles A1 to A8. Also, the cutting angles A1 to A8 respectively correspond to the object sections 33a to 33h with respect to a horizontal plane. Thus, the controller 210 may decide the rotating angles of the rotatable platform 240 according to the values of the cutting angles A1 to A8, and controls the shape of irradiation of the light source module 230 according to sub-cross-sectional profiles of the object sections 33a to 33h.

Figure 3B:
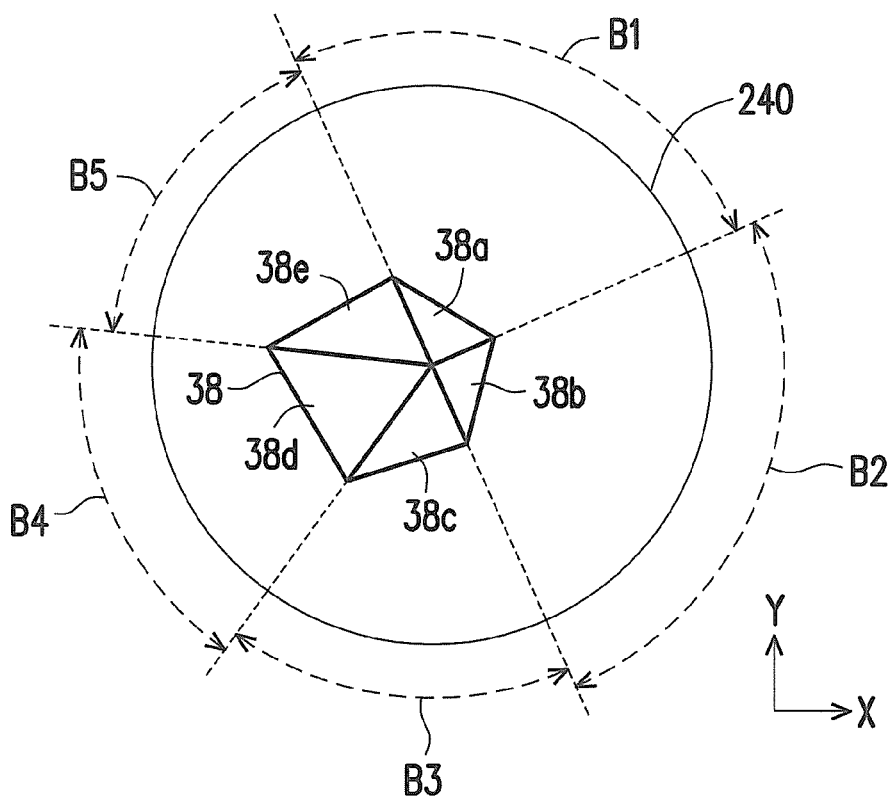

Also, FIG. 3B is an exemplary schematic view illustrating dividing one layer object according to an embodiment of the disclosure. In the example shown in FIG. 3B, it is assumed that there are five cutting angles, which are cutting angles B1, B2, B3, B4, and B5. Values of the cutting angles B1 to B5 are different from each other, and a total of the values of the cutting angles B1 to B5 are 360 degrees.

Accordingly, a layer object 38 may be divided into five object sections, which are object sections 38a, 38b, 38c, 38d, and 38e, according to the cutting angles B1 to B5. Also, the cutting angles B1 to B5 respectively correspond to the object sections 38a to 33e. Thus, the controller 210 may decide the rotating angle of the rotatable platform 240 according to the values of the cutting angles B1 to B5, and controls the shape of irradiation of the light source module 230 according to sub-cross-sectional profiles of the object sections 38a to 33e.

Nevertheless, it should be noted that FIG. 3A and FIG. 3B merely illustrate examples of the disclosure and are not intended to limit the disclosure. This disclosure is not intended to limit the number and value of the cutting angle, which may be varied and designed by people having ordinary skills in the art according to the actual requirements and application. However, it is known that the more the number of the cutting angles is, the more times of rotation of the rotatable platform are required to sequentially solidify each of the object sections of one layer object at the bottom of the tank.

It should be noted that in an exemplary embodiment, the value and number of the cutting angle may be further determined by the cross-sectional profile of the layer object, so as to keep a cross-sectional area of each of the object sections lower than a threshold value. In this way, a circumstance that the cross-sectional area of the object section is too large, making the viscosity between the tank and the bottom too high and the rotation of the rotatable platform unable to successfully separate the object section and the tank can be avoided.

Figure 4A:
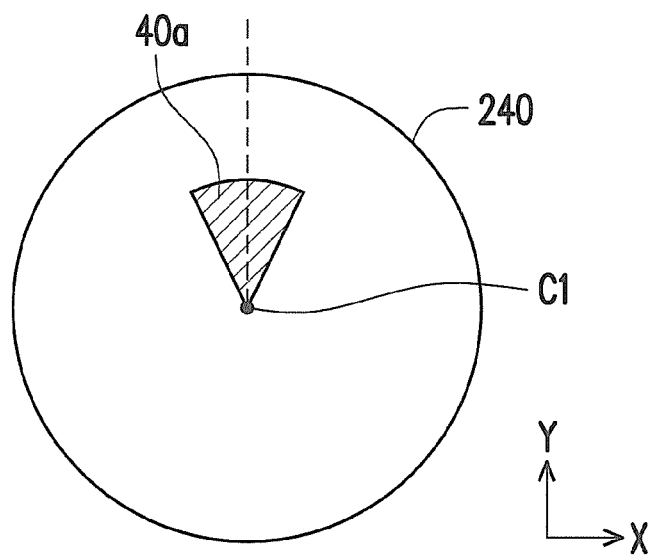
FIGS. 4A to 4C are exemplary schematic views illustrating printing a plurality of object sections according to an embodiment of the disclosure.
Figure 4B:
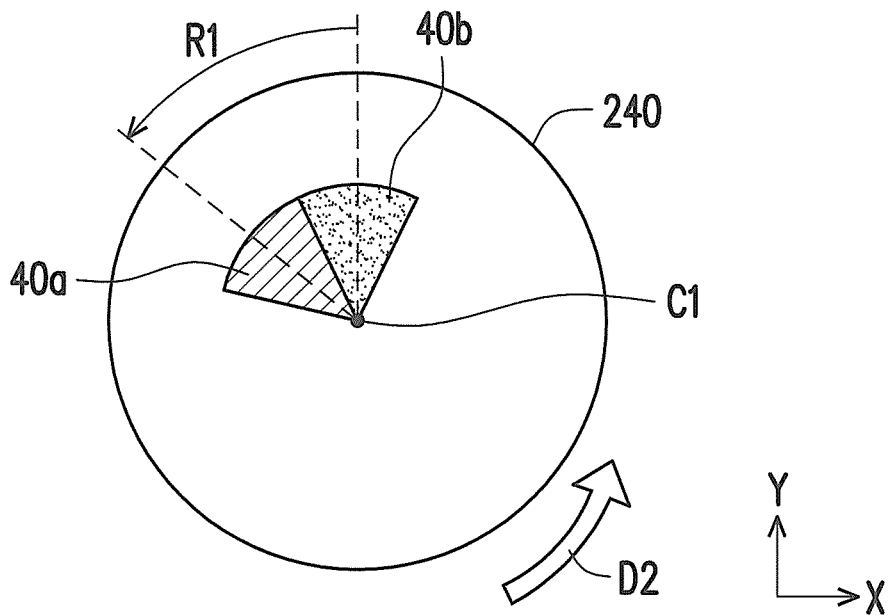
Figure 4C:
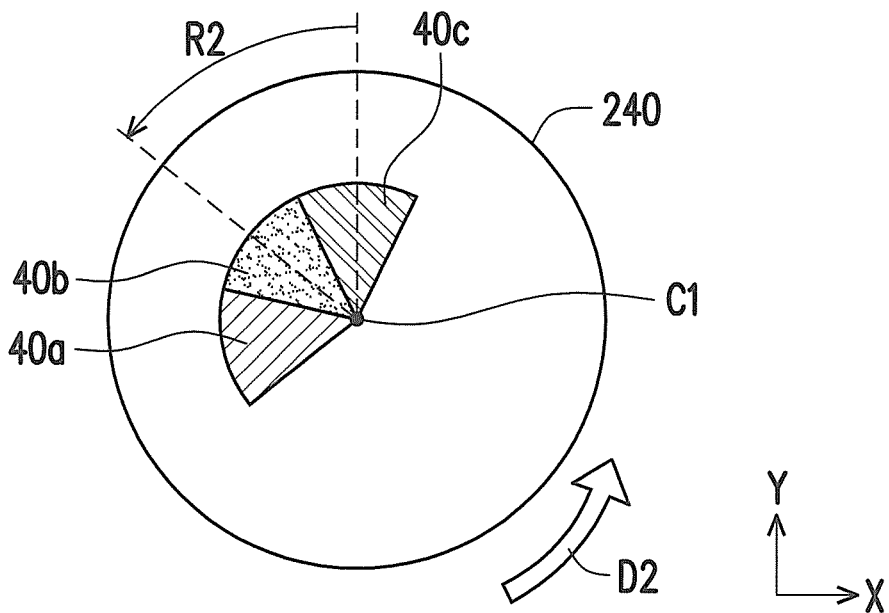

FIGS. 4A to 4C are exemplary schematic views illustrating printing a plurality of object sections according to an embodiment of the disclosure. Referring to FIG. 4A, the controller 210 firstly controls the light source module 230 to irradiate the liquid-formation material 202 in the tank 220 according to a sub-cross-sectional profile of an object section 40a, such that the object section 40a is formed between the rotatable platform 240 and the bottom 218 of the tank 220. Then, referring to FIG. 4B, after the rotatable platform 240 rotates a rotating angle R1 around a central point C1 along a rotating direction D2, the controller 210 controls the light source module 230 to irradiate the liquid-formation material 220 according to a sub-cross-sectional profile of an object section 40b, so as to solidify the object section 40b between the rotatable platform 240 and the bottom 218 of the tank 220.

Then, referring to FIG. 4C, after the object section 40b is formed between the rotatable platform 240 and the bottom 218 of the tank 220, the controller 210 controls the rotatable platform 240 to rotate a rotating angle R2 around the central point C1 along the rotating direction D2. Then, after the rotatable platform 240 rotates the rotating angle R2, the controller 210 controls the light source module 230 to irradiate the liquid-formation material 202 according to a sub-cross-sectional profile of an object section 40c, so as to solidify the object section 40c between the rotatable platform and the bottom 218 of the tank 220. It can thus be known that based on the printing method shown in FIGS. 4A to 4C, the rotatable platform 240 needs to rotate a cycle to completely print one layer object. Namely, during the process of printing the layer object, a total of values of the rotating angles of the rotatable platform 240 are 360 degrees.

Figure 5A:
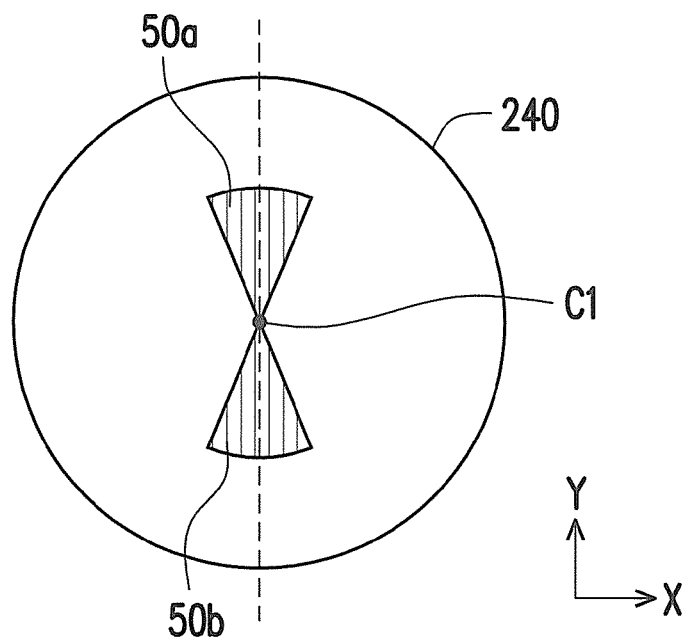
FIGS. 5A to 5C are exemplary schematic views illustrating printing a plurality of object sections according to an embodiment of the disclosure.
Figure 5B:
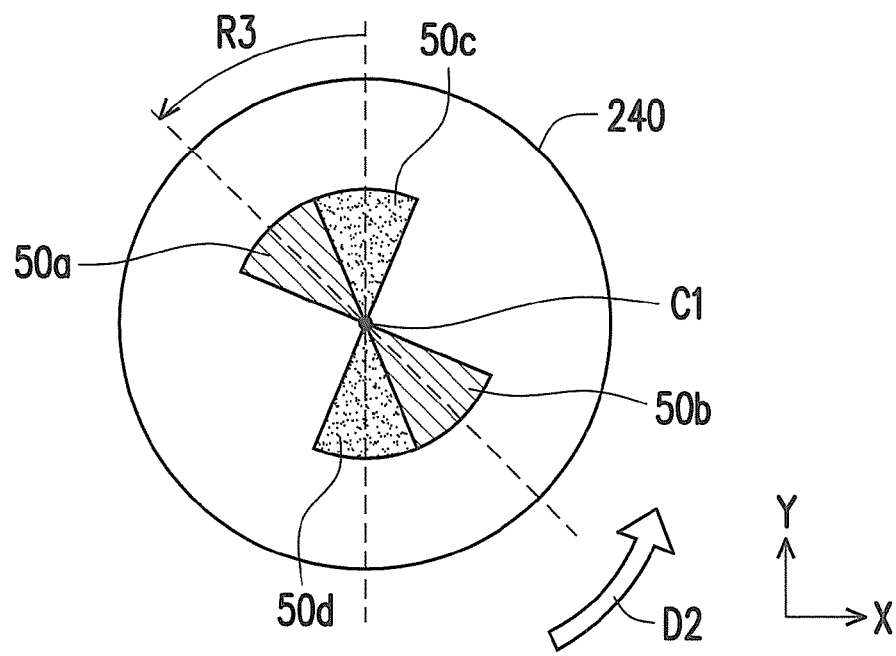
Figure 5C:
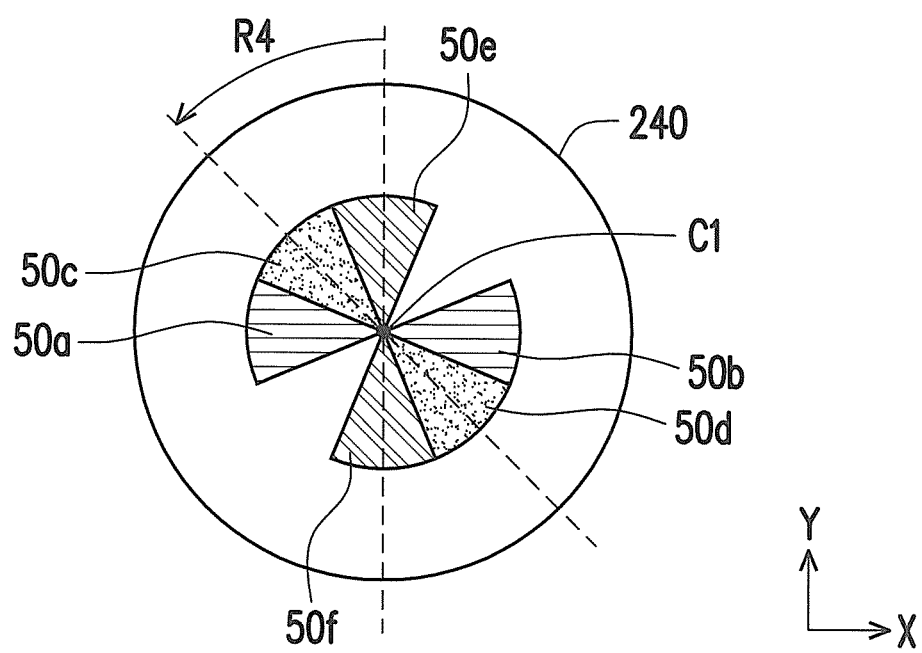

FIGS. 5A to 5C are exemplary schematic views illustrating printing a plurality of object sections according to an embodiment of the disclosure. In the example shown in FIGS. 5A to 5C, the number of the cutting angles to divide one layer object is an even number. Therefore, the number of the object sections of the layer object is equivalently an even number. In this example, two object sections in opposite directions are simultaneously formed through irradiation of the light source module 230. First, referring to FIG. 5A, the controller 210 firstly controls the light source module 230 to irradiate the liquid-formation material 202 in the tank 220 according to a sub-cross-sectional profile of an object section 50a and a sub-cross-sectional profile of an object section 50b, such that the object sections 50a and 50b are formed between the rotatable platform 240 and the bottom 218 of the tank 220.

Then, referring to FIG. 5B, after the rotating platform 240 rotates a rotating angle R3 around the central point C1 along the rotating direction D2, the controller 210 controls the light source module 230 to irradiate the liquid-formation material 202 according to a sub-cross-sectional profile of an object section 50c and a sub-cross-sectional profile of an object section 50d, so as to simultaneously solidify the object sections 50c and 50d between the rotatable platform 240 and the bottom 218 of the tank 220. Then, referring to FIG. 5C, after the object sections 50c and 50d are formed between the rotatable platform 240 and the bottom 218 of the tank 220, the controller 210 controls the rotatable platform 240 to rotate a rotating angle R4.

Then, after the rotatable platform 240 rotates the rotating angle R4, the controller 210 controls the light source module 230 to irradiate the liquid-formation material 202 according to a sub-cross-sectional profile of an object section 50e and a sub-cross-sectional profile of an object section 50f, so as to simultaneously solidify the object sections 50e and 50f between the rotatable platform 240 and the bottom 218 of the tank 220. It can thus be known that based on the printing method shown in FIGS. 5A to 5C, the rotatable platform 240 needs to rotate a half of a cycle to completely print one layer object. Namely, during the process of printing the layer object, the total of values of the rotating angles of the rotatable platform 240 are 180 degrees. Thus, by simultaneously printing the object sections at opposite positions, the number of times of rotation of the rotatable platform 240 is reduced and a printing time is shortened as well.

FIG. 6 is an exemplary schematic view illustrating changing an irradiated area according to an embodiment of the disclosure. Referring to FIG. 6, the controller 210 may control the rotatable platform 240 to rotate around the axial direction 20, such that all surface parts of the formation surface S1 of the rotatable platform 240 are able to be sequentially rotated to an area above an irradiated area Z1. Accordingly, the controller 210 may control the light source module 230 to provide light to the irradiated area Z1, so as to sequentially solidify a plurality of object sections of an N-th layer object. In addition, N is an integer greater than zero. Then, the controller 210 may control the rotatable platform 240 to rotate, such that all surface parts of the formation surface S1 of the rotatable platform 240 may be sequentially rotated to an area above another irradiated area Z2. Accordingly, the controller 210 controls the light source module 230 to provide light to the another irradiated area Z2, so as to sequentially solidify a plurality of object sections of an (N+a)-th layer object. In addition, a is an integer greater than zero. However, it should be noted that the disclosure is not intended to limit a shape of the tank 220. Any tank that allows the rotatable platform to be immersed into the liquid-formation material 202 and allows the rotatable platform to rotate falls in the scope of protection of the disclosure. For example, the tank 220 shown in FIG. 6 is a container having a circular base area, but the tank 220 may also be a container having a rectangular base area.

In other words, the object sections of the N-th layer object are respectively formed above the irradiated area Z1 at the bottom 218 of the tank 220, while the object sections of the (N+a)-th layer object are respectively formed above the irradiated area Z2 at the bottom 218 of the tank 220. The irradiated areas Z1 and Z2 are areas at the bottom 218 and are not overlapped with respect to each other. Thus, by changing the irradiated area irradiated by the light source module 230, a coating (e.g. a coating formed of a silicon rubber material) on the bottom 218 of the tank 220 may not be rapidly worn off due to reiterative separation processes between the object sections and the tank 220 in one area.

FIG. 7 is a flowchart illustrating a printing method of a three-dimensional printing apparatus according to an embodiment of the disclosure. The printing method is adapted for printing a three-dimensional object, and detailed description may be referred to the description of FIGS. 1 to 6. First of all, at Step S701, sub-cross-sectional profiles of object sections of at least one layer object are obtained according to three-dimensional model information of the layer object and a plurality of cutting angles. At Step S702, when the rotatable platform is moved to a height along an axis direction, the rotatable platform is controlled to sequentially rotate a plurality of rotating angles around the axis direction, and the light source module is controlled to irradiate the liquid-formation material according to sub-cross-sectional profiles of each of the object sections, so as to sequentially solidify the object sections of the layer object.

In the embodiments shown in FIGS. 2 to 7, when the three-dimensional printing apparatus 200 is printing one layer object, the rotatable platform 240 sequentially rotates a plurality of rotating angles, and each time when the rotatable platform 240 rotates one rotating angle, the controller 210 controls the light source module 230 to irradiate the liquid-formation material 202, so as to solidify and form one of the object sections forming the layer object. In this way, when the rotatable platform 240 rotates a cycle at a fixed height, the layer object is completely formed between the tank 220 and the rotatable platform.

Figure 8:
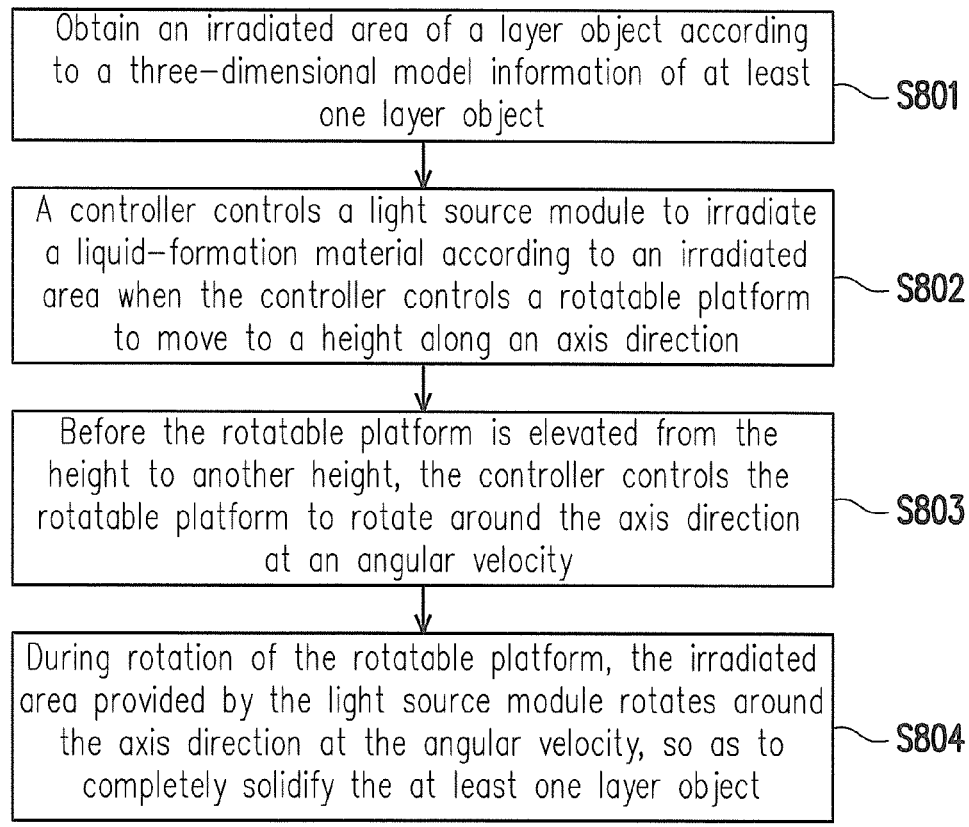
FIG. 8 is a flowchart illustrating a printing method of a three-dimensional printing apparatus according to an embodiment of the disclosure.

Nevertheless, another embodiment is provided in the following to explain how the controller 210 of the three-dimensional printing apparatus 200 simultaneously controls the rotatable platform 240 and a range of irradiation of the light source module 230 during the rotation of the rotatable platform 240, so as to print a layer object. FIG. 8 is a flowchart illustrating a printing method of a three-dimensional printing apparatus according to an embodiment of the disclosure. The printing method is adapted to print a three-dimensional object, and the three-dimensional object includes at least one layer object.

First of all, at Step 801, the controller 210 obtains an irradiated area of a layer object according to three-dimensional model information of at least one layer object. It should be noted in particular that in this embodiment, the light source module 230 may provide a planar light source. For example, the light source module 230 may be a light projection module based on digital light processing (DLP) technology. In other words, the light source module 230 may provide a corresponding irradiated area according to a cross-sectional profile of the layer object, and solidify each layer object according to the cross-sectional profile of the layer object. In other words, the irradiated area is determined based on the cross-sectional profile of each layer object.

Then, at Step S802, when the controller 210 controls the rotatable platform 240 to move to a height along Z-axis, the controller 210 controls the light source module 230 to irradiate the liquid-formation material 220 according to the irradiated area of the layer object. In this way, since the light source module 230 of this embodiment is a planar light source module, the whole layer object is gradually solidified and formed. It should be noted that when one layer object is gradually being solidified but not completely solidified under the irradiation of the light source module 230, the controller 210 of this embodiment may control the rotatable platform 240 to rotate around Z-axis at an angular velocity.

Accordingly, at Step S803, when the rotatable platform 240 elevates from the current height to another height along Z-axis, the controller 210 controls the rotatable platform 240 to rotate around Z-axis at an angular velocity. In other words, before the controller 210 controls the rotatable platform 240 to elevate and print another layer object, the controller 210 controls the rotatable platform 240 to start rotating. At the same time, at Step S804, the irradiated area provided by the light source module 230 rotates along the Z-axis at the angular velocity during the rotation of the rotatable platform 240, so as to completely solidify the layer object being printed. More specifically, to completely solidify the layer object that is not completely solidified yet, the controller 210 controls the light source module 230 to continue irradiating during the rotation of the rotatable platform 240. However, the range of irradiation provided by the light source module 230 rotates with the rotation of the rotatable platform 240. Consequently, the layer object being printed is completely solidified and formed during the rotation of the rotatable platform 240. It should be noted that the controller 210 controls the rotatable platform 240 to rotate at a specific angular velocity, and the irradiated area provided by the light source module 230 also rotates at the same angular velocity.

Figure 9A:
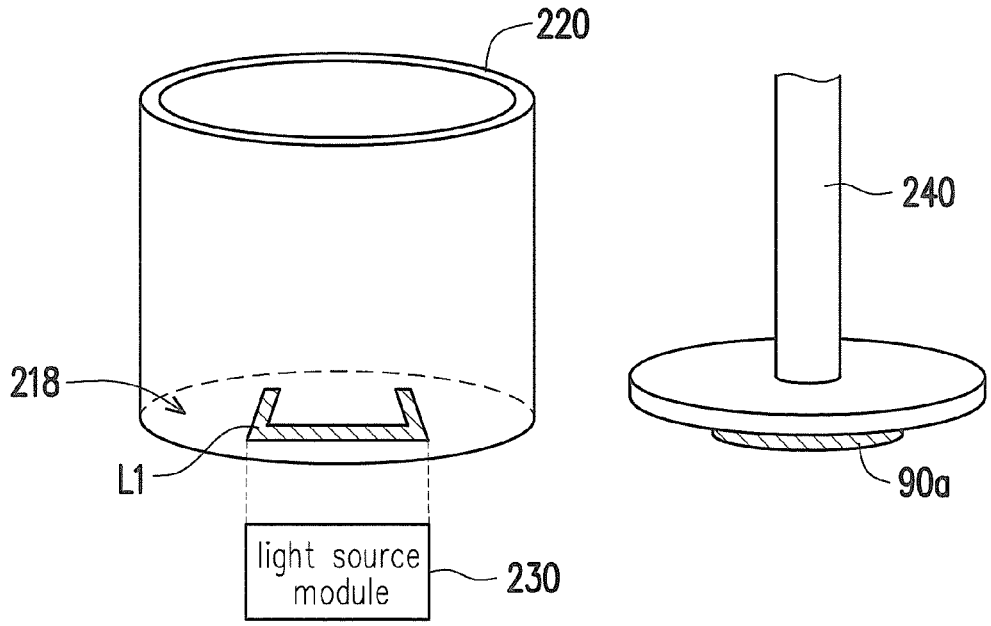
FIGS. 9A to 9C are exemplary schematic diagrams illustrating that an irradiated area rotates along with a rotatable platform according to an embodiment of the disclosure.
Figure 9B:
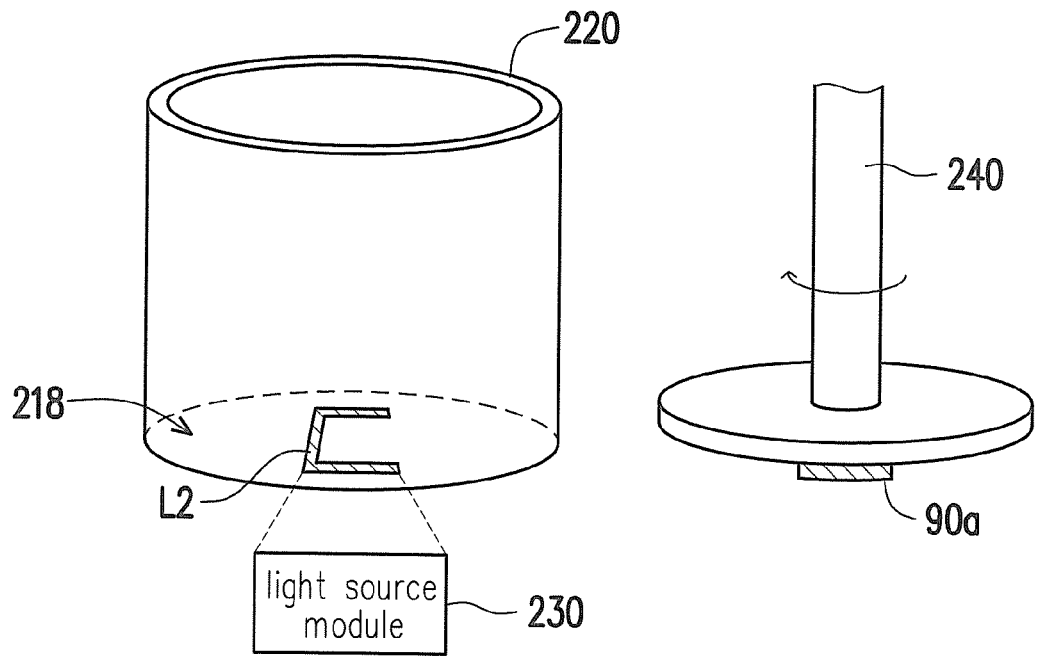
Figure 9C:
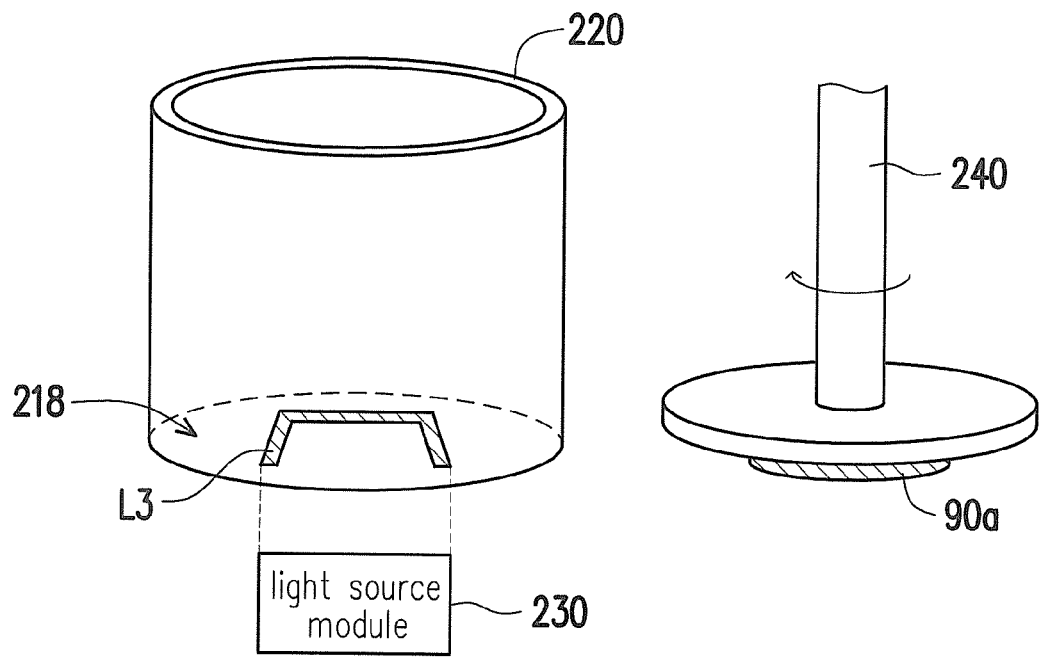

FIGS. 9A to 9C are exemplary schematic diagrams illustrating that an irradiated area rotates along with a rotatable platform according to an embodiment of the disclosure. It should be noted that to clearly illustrate this embodiment, the rotatable platform 240 is separately illustrated beside the tank 220. However, people having ordinary skills in the art should understand that the rotatable platform 240 should be disposed above the tank 220 and is suitable to be immersed into the liquid-formation material in the tank 220. Firstly, referring to FIG. 9A, when the controller 210 controls the rotatable platform 240 to move to a height and start printing a layer object 90a, the controller 210 controls the light source module 230 to provide an irradiated area L1 at the bottom 218 of the tank 220. In this way, the layer object 90a is gradually solidified between the rotatable platform 240 and the bottom 218 of the tank 220 according to the irradiated area L1.

Then, before the layer object 90a is completely solidified, the controller 210 controls the rotatable platform 240 to rotate at an angular velocity. Meanwhile, the controller 210 also controls the irradiated area provided by the light source module 230 to rotate together at the same angular velocity, such that the layer object 90a may be completely solidified and formed during the rotation of the rotatable platform 240.

For example, as shown in FIG. 9B, when the rotatable platform 240 rotates a first angle in a clockwise direction, the controller 210 controls the light source module 230 to irradiate the bottom 218 of the tank 220 according to the irradiated area L2. In addition, an outer profile of the irradiated area L2 is the same as an outer profile of the irradiated area L1. After rotating the same first angle along Z-axis, the irradiated area L1 may be completely overlapped with the irradiated area L2.

Referring to FIG. 9C, when the rotatable platform 240 rotates a second angle in the clockwise direction, the controller 210 controls the light source module 230 to irradiate the bottom 218 of the tank 220 according to an irradiated area L3. In addition, an outer profile of the irradiated area L3 is the same as the outer profile of the irradiated area L2. After rotating the same second angle along Z-axis, the irradiated area L2 may be completely overlapped with the irradiated area L3. In this way, although the rotatable platform 240 rotates at an angular velocity, the irradiated area provided by the light source module 230 of this embodiment may also rotate at the same angular speed. Therefore, the layer object 90a is completely solidified during the rotation of the rotatable platform 240. After the layer object 90a is completely solidified and formed, the controller 210 controls the rotatable platform 240 to elevate to another height, and the controller 210 reiteratively prints another layer object according to the same control procedure.

In view of the foregoing, in the embodiments of the disclosure, each time when the rotatable platform is at a height and sequentially rotates one of the rotating angles during the process of printing one layer object, the light source module may sequentially irradiate the liquid-formation material according to the profile information of each object section. Besides, when the printing process of each object section is completed, the three-dimensional printing apparatus of the disclosure may separate the object section that is just solidified and the bottom of the tank by rotating the rotatable platform. In this way, the three-dimensional printing apparatus of the disclosure saves a step of shaking the tank to separate the layer object and the tank, and the speed and quality of three-dimensional printing are thus improved. Moreover, by simultaneously printing the object sections at opposite positions, the number of times of rotation of the rotatable platform is reduced, and the printing time is further shortened.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A three-dimensional printing apparatus, for printing a three-dimensional object comprising at least one layer object, the apparatus comprising:
   a tank, containing a liquid-formation material;
   a rotatable platform, elevatably disposed above the tank;
   a light source module, disposed under the tank;
   a controller, coupled to the light source module and the rotatable platform,
   wherein when the controller controls the rotatable platform to move to a height along an axis direction, the controller controls the rotatable platform to sequentially rotate a plurality of rotating angles around the axis direction and controls the light source module to irradiate the liquid-formation material, so as to sequentially solidify a plurality of object sections of the at least one layer object, and each of the rotating angles at least corresponds to one of the object sections,
   wherein after the rotatable platform rotates one of the rotating angles, the controller controls the light source module to irradiate the liquid-formation material to solidify one of the object sections of the at least one layer object, and the one of the object sections is separated from the bottom of the tank in response to controlling the rotatable platform to rotate another one of the rotating angles by the controller for controlling the light source module to irradiate the liquid-formation material to solidify next one of the object sections.

2. The three-dimensional printing apparatus as claimed in claim 1, wherein the at least one layer object is divided into the object sections according to values of a plurality of cutting angles, and the cutting angles respectively correspond to the object sections,
   wherein sub-cross-sectional profiles of the object sections projected on a horizontal plane are determined based on the values of the corresponding cutting angles and a cross-sectional profile of the at least one layer object on the horizontal plane,
   wherein the controller controls the light source module to irradiate the liquid-formation material according to all the sub-cross-sectional profile of each of the object sections.

3. The three-dimensional printing apparatus as claimed in claim 2, wherein the values of the cutting angles are the same, and a total of the values of the cutting angles are 360 degrees.

4. The three-dimensional printing apparatus as claimed in claim 2, wherein the values of the cutting angles are different from each other, and a total of the values of the cutting angles are 360 degrees.

5. The three-dimensional printing apparatus as claimed in claim 1, wherein the object sections at least comprise a first object section and a second object section,
   wherein after the rotatable platform rotates one of the rotating angles, the controller controls the light source module to irradiate the liquid-formation material according to a sub-cross-sectional profile of the first object section, so as to solidify the first object section between the rotatable platform and a bottom of the tank.

6. The three-dimensional printing apparatus as claimed in claim 5, wherein after the first object section is formed between the rotatable platform and the bottom of the tank, the controller controls the rotatable platform to rotate another one of the rotating angles,
   wherein after the rotatable platform rotates the another one of the rotating angles, the controller controls the light source module to irradiate the liquid-formation material according to a sub-cross-sectional profile of the second object section, so as to solidify the second object section between the rotatable platform and the bottom of the tank.

7. The three-dimensional printing apparatus as claimed in claim 5, wherein a total of the values of the rotating angles are 360 degrees.

8. The three-dimensional printing apparatus as claimed in claim 1, wherein the number of the cutting angles is an even number, and the object sections at least comprise a first object section and a second object section,
   wherein after the rotating platform rotates one of the rotating angles, the controller controls the light source module to irradiate the liquid-formation material according to a sub-cross-sectional profile of the first object section and a sub-cross-sectional profile of the second object section, so as to simultaneously solidify the first object section and the second object section between the rotatable platform and the bottom of the tank.

9. The three-dimensional printing apparatus as claimed in claim 8, wherein the object sections further comprise a third object section and a fourth object section,
  wherein after the first object section and the second object section are formed between the rotatable platform and the bottom of the tank, the controller controls the rotatable platform to rotate another one of the rotating angles,
  wherein after the rotating platform rotates another one of the rotating angles, the controller controls the light source module to irradiate the liquid-formation material according to a sub-cross-sectional profile of the third object section and a sub-cross-sectional profile of the fourth object section, so as to simultaneously solidify the third object section and the fourth object section between the rotatable platform and the bottom of the tank.

10. The three-dimensional printing apparatus as claimed in claim 8, wherein a total of the values of the rotating angles are 180 degrees.

11. The three-dimensional printing apparatus as claimed in claim 1, wherein the at least one layer object comprises a first layer object and a second layer object,
  a plurality of first object sections of the first layer object are respectively formed above an irradiated area at the bottom of the tank, and a plurality of second object sections of the second layer object are respectively formed above another irradiated area at the bottom of the tank, wherein the irradiated area and the another irradiated area are printing areas at the bottom and are not overlapped with each other.

12. A three-dimensional printing apparatus, for printing a three-dimensional object comprising at least one layer object, the apparatus comprising:
  a tank, containing a liquid-formation material;
  a rotatable platform, elevatably disposed above the tank;
  a light source module, disposed under the tank;
  a controller, coupled to the light source module and the rotatable platform,
  wherein when the controller controls the rotatable platform to move to a height along an axis direction, the controller controls the light source module to irradiate the liquid-formation material according to an irradiated area,
  wherein before the rotatable platform elevates from the height to another height along the axis direction, the controller controls the rotatable platform to rotate around the axis direction, and during rotation of the rotatable platform, a range of the irradiated area provided by the light source module rotates with the rotation of the rotatable platform, so as to completely solidify the at least one layer object.

13. The three-dimensional printing apparatus as claimed in claim 12, wherein the controller controls the rotatable platform to rotate at an angular velocity, and the irradiated area provided by the light source module rotates at the angular velocity.

14. The three-dimensional printing apparatus as claimed in claim 12, wherein the light source module provides a planar light source.

15. The three-dimensional printing apparatus as claimed in claim 12, wherein the irradiated area is determined based on a cross-sectional profile of the at least one layer object.

* * * * *